(12) United States Patent
Hu et al.

(10) Patent No.: US 10,666,689 B2
(45) Date of Patent: May 26, 2020

(54) SECURITY IN SOFTWARE DEFINED NETWORK

(71) Applicant: Alcatel Lucent, Boulogne Billancourt (FR)

(72) Inventors: Zhiyuan Hu, Shanghai (CN); Xueqiang Yan, Shanghai (CN); Zhigang Luo, Shanghai (CN)

(73) Assignee: ALCATEL LUCENT, Nozay (FR)

( * ) Notice: Subject to any disclaimer, the term of this patent is extended or adjusted under 35 U.S.C. 154(b) by 0 days.

(21) Appl. No.: 15/319,464

(22) PCT Filed: Jun. 30, 2014

(86) PCT No.: PCT/CN2014/081235
§ 371 (c)(1),
(2) Date: Dec. 16, 2016

(87) PCT Pub. No.: WO2016/000160
PCT Pub. Date: Jan. 7, 2016

(65) Prior Publication Data
US 2017/0324781 A1     Nov. 9, 2017

(51) Int. Cl.
*G06F 21/00* (2013.01)
*H04L 29/06* (2006.01)
*G06F 21/55* (2013.01)

(52) U.S. Cl.
CPC ............ *H04L 63/205* (2013.01); *G06F 21/55* (2013.01); *H04L 29/06* (2013.01); *H04L 63/0227* (2013.01); *H04L 63/0245* (2013.01); *H04L 63/08* (2013.01); *H04L 63/10* (2013.01); *H04L 63/105* (2013.01); *H04L 63/123* (2013.01);
(Continued)

(58) Field of Classification Search
CPC ... H04L 63/205; H04L 63/20; H04L 63/0227; H04L 63/16; H04L 63/126; H04L 63/14; H04L 63/123; H04L 63/10; H04L 29/06; H04L 63/0245; H04L 63/08; H04L 63/105; G06F 21/55
See application file for complete search history.

(56) References Cited

U.S. PATENT DOCUMENTS

2012/0023546 A1*   1/2012   Kartha ................. H04L 63/104
                                                                    726/1
2013/0121207 A1    5/2013   Parker
2013/0291088 A1   10/2013   Shieh et al.
(Continued)

FOREIGN PATENT DOCUMENTS

CN          1777122 A      5/2006
CN       103326884 A      9/2013
(Continued)

OTHER PUBLICATIONS

International Search Report for PCT/CN2014/081235 dated Mar. 27, 2015.

*Primary Examiner* — Alexander Lagor
(74) *Attorney, Agent, or Firm* — Fay Sharpe LLP (57) ABSTRACT

At least one security policy is obtained from a policy creator at a controller in an SDN network. The security policy is implemented in the SDN network, via the controller, based on one or more attributes specifying a characteristic of the security policy, a role of the creator of the security policy, and a security privilege level of the role of the creator of the security policy.

23 Claims, 3 Drawing Sheets

(52) U.S. Cl.
CPC ............ *H04L 63/126* (2013.01); *H04L 63/14* (2013.01); *H04L 63/16* (2013.01); *H04L 63/20* (2013.01)

(56) References Cited

U.S. PATENT DOCUMENTS

| | | |
|---|---|---|
| 2013/0311675 A1 | 11/2013 | Kancherla |
| 2014/0052836 A1 | 2/2014 | Nguyen et al. |
| 2014/0075498 A1* | 3/2014 | Porras ................... H04L 63/107 726/1 |
| 2014/0089506 A1 | 3/2014 | Puttaswamy Naga et al. |

FOREIGN PATENT DOCUMENTS

| | | |
|---|---|---|
| CN | 103607379 A | 2/2014 |
| JP | 2007-257428 A | 10/2007 |
| JP | 2008-537829 A | 9/2008 |
| WO | 2007/111234 A1 | 10/2007 |
| WO | 2012/141086 A1 | 10/2012 |
| WO | 2013/158917 A2 | 10/2013 |
| WO | 2014/063129 A1 | 4/2014 |

\* cited by examiner

SECURITY IN SOFTWARE DEFINED NETWORK

FIELD

The application relates generally to communication networks, and more particularly to security techniques in a software defined networking-based communication network.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Software defined networking (SDN) is a network architecture framework that decouples network control from the underlying network switching infrastructure so as to enable network control to become directly programmable. This decoupling allows the underlying network infrastructure to be abstracted for applications and services running on the network. An SDN controller is used to manage flow control in an SDN network. For example, SDN controllers are typically based on protocols, such as the OpenFlow™ (Open Networking Foundation) protocol, that allow control servers to instruct network elements (e.g., switches) where to send packets. In such a scenario, the SDN controller is referred to as an OpenFlow™ controller and the switches are referred to as OpenFlow™ switches. Such a controller serves as a type of operating system for the SDN network. By separating the control plane from the network hardware and running the control plane instead as software, the controller facilitates automated network management, as well as integration and administration of applications and services.

However, there are challenging security issues in an SDN network that are not addressed by existing security mechanisms.

SUMMARY

Illustrative embodiments provide security techniques for use in an SDN network.

For example, in one embodiment, a method includes the following steps. At least one security policy is obtained from a policy creator at a controller in an SDN network. The security policy is implemented in the SDN network, via the controller, based on one or more attributes specifying a characteristic of the security policy, a role of the creator of the security policy, and a security privilege level of the role of the creator of the security policy.

In another embodiment, an article of manufacture is provided which comprises a processor-readable storage medium having encoded therein executable code of one or more software programs. The one or more software programs when executed by at least one processing device implement steps of the above-described method.

In yet another embodiment, an apparatus comprises a memory and a processor configured to perform steps of the above-described method.

Advantageously, illustrative embodiments provide techniques in an SDN network that address security concerns including, but not limited to, accurately translating network policies into flow rules, handling scenarios where new flow rules conflict with previous flow rules, automatically and promptly reacting to new security attacks, and supporting packet data scan detection.

These and other features and advantages of embodiments described herein will become more apparent from the accompanying drawings and the following detailed description.

DETAILED DESCRIPTION

Illustrative embodiments will be described herein with reference to exemplary computing systems, data storage systems, communication networks, processing platforms, systems, user devices, network nodes, network elements, clients, servers, and associated communication protocols. For example, illustrative embodiments are particularly well-suited for use in a software defined networking (SDN) environment. However, it should be understood that embodiments are not limited to use with the particular arrangements described, but are instead more generally applicable to any environment in which it is desirable to provide mechanisms and methodologies for improved security in a communication network.

As mentioned above, there are challenging security issues in an SDN network that are not addressed by using existing security mechanisms and methodologies. Illustrative embodiments address such challenging security issues.

For example, one security issue addressed herein is how to enable the SDN controller to receive network policies in a secure manner. It is realized that the SDN controller should assure that the policy creators (e.g., applications, network administrators and management servers) are authentic. Moreover, confidentiality and integrity should be guaranteed for those policies in transmission. As will be explained further below, illustrative embodiments provide these assurances.

Another security issue addressed herein is how to accurately translate network policies into flow rules. It is realized that network policies (in this case, security policies) should be precisely translated into flow rules based on attributes such as identity, role and security privilege level of policy creators. In this manner, one or more security countermeasures can be operated without bypass. As will be explained further below, illustrative embodiments provide this precise translation.

Yet another security issue addressed herein is how to implement packet data scan detection. Currently, the OpenFlow™ protocol as part of one of the SDN southbound interface implementations only supports packet header scan detection. In an OpenFlow™ switch, flows are forwarded or dropped by matching packet headers with match fields in OpenFlow™ tables. However, it is realized that packet data scan detection should be performed in order to prevent some attacks such as worm and spam information. As will be explained further below, illustrative embodiments provide packet scan detection that addresses these issues.

A further security issue addressed herein is how to deal with new flow rules that conflict with old flow rules. For example, assume a new flow rule to be created in Switch_1 specifies that packets with VLAN_ID_4 should be forwarded to port 5. Further assume that the new flow rule will replace the old flow rule in Switch_1 that specifies packets with VLAN_ID_4 should be forwarded to port 6. However, the old flow rule was created by a security administrator in order to do packet scan detection forcibly. This old flow rule should not be replaced with the new flow rule. As will be explained further below, illustrative embodiments address these types of conflict issues.

Yet a further security issue addressed herein is how to secure flow rules transported from the SDN controller to a network switch. In the OpenFlow™ protocol, it is mentioned that Transport Layer Security (TLS) may be used to secure the transportation. However, details of implementation such as which version and cipher suites can be used are not discussed. As will be explained further below, illustrative embodiments address this issue.

Another security issue addressed herein is how to automatically and promptly react to new attacks. As will be explained further below, illustrative embodiments address this issue. Yet another security issue addressed herein is how to guarantee that the execution environment of the SDN controller is secure. A logically centralized SDN controller enables operators to program their network more flexibly. However, it may expose a single high-value asset to attackers. It is important for operators to mitigate some of the threats by deploying the SDN controller in a secure execution environment. As will be explained further below, illustrative embodiments address this issue.

Illustrative embodiments provide an SDN security architecture that addresses the above and other security issues. In particular, illustrative embodiments introduce attributes associated with flow rules in the SDN controller to address such security issues. In one embodiment, these security attributes comprise: (i) a characteristic of network policy; (ii) a role of the policy creator; and (iii) a security privilege level of the role. While each of these three security features are specified as separate attributes as illustratively described herein, it is to be understood that one or more of the security features can be specified together as one attribute.

The characteristic of network policy attribute is used to describe whether or new network policies are real-time policies or can be put into operation with some delay. For a real-time policy, the policy should be translated into flow rules, updated in flow tables, and then synchronized with the SDN switches without any delay. These real-time policies may react against security attacks detected online by security appliances (e.g., firewall, DPI, and IDP). For those policies which can be operated with some delay, they will be translated into flow rules, updated in flow tables, and then synchronized with the SDN switches in batches periodically in order to improve system performance.

The role of policy creator attribute is used to define the role of the administrator/application that creates a given network policy. The role of creator may be a security administrator, a general administrator, a user, or a guest.

The security privilege level of role attribute is used to specify different security privilege levels for different roles of policy creators. Hierarchical levels from the highest to the lowest may be L5, L4, L3, L2, L1, and L0. The role with the relatively higher security privilege level is given more rights to access the SDN controller. For example, the policy created by the creator with relatively low security privilege level is replaced by the policy created by the creator with a higher level. In one illustrative embodiment, security privilege levels of roles can be set as follows: security administrator –L5 (highest); general administrator –L4; user –L2; and guest –L1. It is to be understood that, in this illustrative embodiment, there is no dedicated role for security privilege levels L3 and L0. However, the quantity and assignment of security privilege levels is open to the developer and can be instantiated based on the specific needs of the SDN network design.

Illustrative embodiments also provide for improved flow table management functionality. This function is used to handle the situation in the event that new flow rules conflict with old flow rules. Currently, a flow entry in an OpenFlow™ table does not distinguish the application generating the new flow rule with the application generating the old rule. So, it is possible for an attacker hijacking an application server to create a new flow rule to replace the flow rule created by a security administrator in order to bypass security detection. Based on the above three new attributes defined in the SDN controller, the security issue mentioned above can be resolved since the flow rule created by the security administrator with a high security privilege level cannot be replaced by the new flow rule with a low security privilege level.

Illustrative embodiments also provide for improved packet data scan detection. According to the current OpenFlow™ protocol v1.4, one possible schema of packet data scan detection is to select m consecutive packets from each n consecutive packets of the flow for scan detection. This schema can be designed for all flows or for only flows meeting some conditions, such as packets to a certain destination, and packets with a specified virtual local area network (VLAN) identifier. In accordance with illustrative embodiments, the OpenFlow™ protocol is extended in order to support packet data scan detection. A new action (OFPAT_DETECTION), which will be described in further detail below, is assigned to all flows meeting the conditions set by the security management functions.

Illustrative embodiments also provide for automatic and prompt reaction to new security attacks. For example, security appliances (e.g., firewall, intrusion detection system (IDS), intrusion prevention system (IPS), deep packet inspection (DPI)) deployed in a data forwarding plane of a network can detect security attacks and report them to security management functions. In order to react against these attacks, security management functions immediately define countermeasures which will be translated into flow rules in the SDN controller then synchronized with SDN switches. Thereafter, those attack packets are dropped or forwarded to a security appliance for further detection before forwarding them out of the network. In this manner, the SDN controller can automatically react to security attacks.

Figure 1:
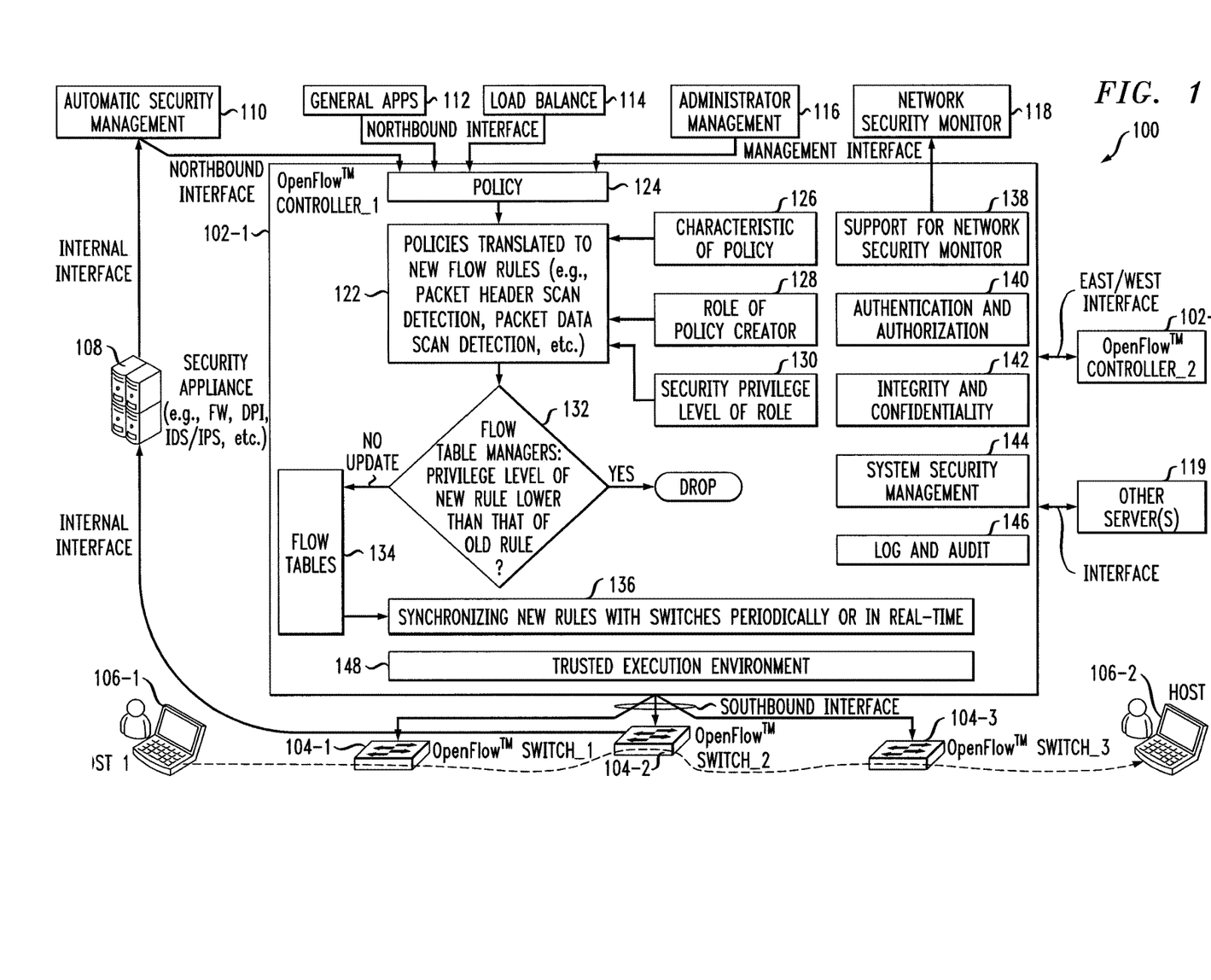
FIG. 1 shows an SDN network with a security architecture according to one embodiment.

Referring now to FIG. 1, a security architecture for an SDN network 100 according to an illustrative embodiment is shown. In this illustrative embodiment, a first SDN controller 102-1, i.e., OpenFlow™ controller_1, is shown. The SDN controller 102-1 is operatively coupled to a second SDN controller 102-2, i.e., OpenFlow™ controller_2, as well as a plurality of SDN switches 104-1 (OpenFlow™ switch_1), 104-2 (OpenFlow™ switch_2), and 104-3 (OpenFlow™ switch_3). Operatively coupled to the SDN switches are host computing devices 106-1 (Host 1) and 106-2 (Host 2). The host computing devices can be, for example, a data server or an end user's computer. It is to be understood that SDN network 100 may comprise more or less controllers, SDN switches, and/or host computing devices than those illustratively shown in FIG. 1. For example, SDN controller 102-2 and/or additional SDN controllers (not expressly shown) can be configured similarly to SDN controller 102-1 so as to securely control additional SDN switches (not expressly shown) that connect to additional host computing devices (not expressly shown).

The SDN network 100 also comprises one or more security appliances 108. As mentioned above, such security appliances provide firewall (FW), DPI, IPS and/or IDS functionalities to the SDN network. Still further, the SDN network 100 comprises an automatic security management module 110, one or more general applications 112, a load balance module 114, an administrator management module 116, a network security monitor 118, and one or more other servers 119.

The SDN controller 102-1 is configured to provide one or more of the security functionalities mentioned above. To provide such functionalities, the SDN controller 102-1 comprises a policy translation module 122, a policy module 124, a characteristic of policy attribute module 126, a role of policy creator attribute module 128, a security privilege level of role attribute module 130, a flow table manager 132, flow tables 134, a rule synchronization module 136, a network security monitor support module 138, authentication and authorization module 140, an integrity and confidentiality module 142, a system security management module 144, a log and audit module 146, and a trusted execution environment 148.

The policy module 124 is configured to receive one or more policies (including network policies, in this case, security policies) from its northbound interface (i.e., from modules 110, 112, and 114) and its management interface (i.e., modules 116 and 118). In order to guarantee that received policies are secure, policy creators (e.g., automatic security management module 110, general applications 112, load balance module 114, and administrator management module 116) are authenticated by module 140 of the SDN controller 102-1. Moreover, confidentiality and integrity checks are provided by module 142 for these policies in transportation.

The characteristic of policy attribute module 126 is configured to specify whether or not the policy will be sent from the SDN controller 102-1 to the SDN switches 104-1, 104-2, and 104-3 in real-time or periodically. For example, the attribute may specify an urgent condition, a general condition, or a default condition. The attribute urgent specifies that this policy has to be synchronized with the switch in real-time without delay. For instance, the policy may be a security countermeasure to stop or mitigate security attacks detected by firewall or DPI functionality of a security appliance 108.

The role of policy creator attribute module 128 is configured to specify the role of a policy creator. As mentioned above, policy creators may be automatic security management module 110, one or more general applications 112, load balance module 114, and administrator management module 116. Thus, the role of creator attribute may be set as a security administrator, a general administrator, a user, or a guest. In one example, the role of the automatic security management module 110 is a security administrator, the role of the load balance module 114 is a general administrator, the role of the one or more general applications 112 is user, and the role of one or more third party applications (not expressly shown) is guest.

The security privilege level of role attribute module 130 is configured to specify the security privilege level given to each role set by module 128. As mentioned above by way of example, the attribute for the security privilege level of roles can be set to one of the security privilege levels L5, L4, L3, L2, L1, and L0, with L5 being the highest security privilege level and L0 being the lowest security privilege level. In one illustrative embodiment, security privilege levels of roles can be set as follows: security administrator –L5 (highest); general administrator –L4; user –L2; and guest –L1. The role with higher security privilege level is given more rights to access the SDN controller. For example, the policy created by the creator role of guest will be replaced by the policy created by the creator role of security administrator.

In the policy translation module 122, security policies are converted to new flow rules. That is, the module 122 is configured to convert (translate) the policy received from the northbound interface and/or the management interface into new flow rules combined with characteristic of policy, role of policy creator, and security privilege level attributes, as will be further explained below.

The flow table manager 132 is configured to manage searching, adding, updating, and deleting of flow entries in flow tables 134. The flow table manager 132 confirms that new flow rules are correctly inserted into the flow tables 134. For example, for a specified data flow, the flow table manager 132 checks if a new flow rule is in conflict with an old (previous) flow rule before inserting new flow rules. If yes, only new flow rules set by a creator with a relatively high security privilege level are permitted to replace the conflicting old flow rules set by a creator with a relatively low security privilege level.

The flow tables 134 store flow rules for the SDN switches 104-1, 104-2, and 104-3.

The rule synchronization module 136 synchronizes new rules with the SDN switches 104-1, 104-2, and 104-3 periodically or in real-time depending on the attribute specified by module 126. In order to improve the performance of communication between the SDN controller 102-1 and a given SDN switch, flow rules with attributes "general" or "default" are synchronized periodically. However, flow rules with attribute "urgent" are pushed to switches as soon as those flow rules are inserted into flow tables.

The network security monitor support module 138 is configured to support administrators in monitoring the entire SDN network, particularly with respect to security issues. For example, assume a security administrator wants to know details regarding a security policy for a specified data flow through network security monitor 118. The network security monitor 118 sends a request to network security monitor support module 138. The network security monitor support module 138 retrieves related information (e.g., flow rules, flow rules generators, etc.) from flow tables 134, analyzes the retrieved information and responds to network security monitor 118. The network security monitor 118 generates a report and displays the report to the security administrator.

The authentication and authorization module 140 is configured to provide mutual authentication, authentication and authorization mechanisms for the SDN network 100. For example, module 140 provides for mutual authentication: between the SDN controller 102-1 and each of the SDN switches 104-1, 104-2, and 104-3 over the southbound interface; between the SDN controller 102-1 and the one or more general applications 112 over the northbound interface; and between the SDN controller 102-1 and the administrator management module 116 and the network security monitor 118 over the management interface. Authentication mechanisms include, but are not limited to, verification of username/password, pre-shared keys, certificates, etc. Authorization mechanisms include, but are not limited to, verification against a black/white list, access control lists (ACL), and role based access control (RBAC).

The integrity and confidentiality module 142 is configured to provide functions including, but not limited to, encryption/decryption, digital signature, Transport Layer Security (TLS), and Internet Protocol Security (IPsec).

The system security management module 144 is configured to provide functions including, but not limited to, installation of software patches, denial of service (DoS) attack detection and prevention, and anti-virus and malware detection and prevention.

The log and audit module 146 is configured to provide functions including, but not limited to, capturing administrator activity (e.g., login activity, file accesses, commands run, etc.) and capturing security policy creator activity (e.g., the time to set security policy, the creator, the role of the creator, etc.).

The trusted execution environment 148 is configured to ensure that sensitive data (e.g., SDN controller operating system, software, flow tables, a characteristic of the security policy, a role of the creator of the security policy, a security privilege level of the role of the creator of the security policy, authentication credentials, and authorization policies) is stored, processed and protected in a trusted environment.

Given the illustrative security architecture of the SDN network 100 described above in the context of FIG. 1, we now describe in further detail four security scenarios that are addressed in accordance with embodiments.

Scenario 1: how does the SDN controller 102-1 translate policies to new rules then to the SDN switches 104-1, 104-2, and 104-3. Assume that automatic security management module 110 sets a policy that data flows from Host_1 106-1 to Host_2 106-2 go through OpenFlow™ Switch_2 104-2 and data flows be copied and forwarded to security appliance 108 (e.g., firewall) for data detection. This is a non-bypass security policy. The procedures of this policy implemented in SDN network 100 are as follows:

1.1) Before automatic security management module 110 sends the policy to the SDN controller 102-1, mutual authentication between them is performed. Authentication mechanisms may be one or more of the following: a) certificate; b) pre-shared key; c) username/password; and d) physical layer security protection. After successful mutual authentication, a session key between the automatic security management module 110 and the SDN controller 102-1 is obtained.

1.2) Automatic security management module 110 sends this policy to the SDN controller 102-1 with confidentiality (encryption) and integrity protection (message/data signature). The confidentiality key and integrity key are generated from the session key obtained in the above step 1.1).

1.3) After data integrity validation and decryption using the keys generated in the same way as automatic security management module 110 does, the SDN controller 102-1 gets this policy from the automatic security management module 110. The SDN controller 102-1 checks if automatic security management module 110 has the right to set policies for the SDN network 100 (meaning module 110 has authorization). For example, this policy is dropped if automatic security management module 110 is in a black list or has no such right to set policies. It is to be appreciated that authentication, authorization, integrity validation, and/or confidentiality validation are not performed in the event that the communication channel between the SDN controller and the policy creator is known to be a secure communication channel.

1.4) The SDN controller 102-1 translates this policy into a flow rule with the following additional attributes:
Characteristic of policy: real-time (meaning this policy has to be applied in the network without any delay);
Role of the policy creator: security administrator; and
Security privileged level of role: L5 (the highest level).

Thus, the current flow table format in the SDN controller 102-1 is extended in order to reflect at least the above three attributes. However, there is no change in the format of flow table in any of the SDN switches 104-1, 104-2, and 104-3.

1.5) The flow table manager 132 is triggered to check if there is an existing or available flow rule in the current flow tables 134 for the specified data flow (for example, identified by source Internet Protocol (IP) address/port and destination IP address/port). It is assumed here that there is no flow rule for data flow from Host_1 106-1 to Host_2 106-2. Flow table manager 132 adds this flow rule into the flow tables 134.

1.6) The rule synchronizer module 136 is triggered to distribute this flow rule to related SDN switches 104-1, 104-2, and/or 104-3 without any delay (since the characteristic of this flow rule is set to real-time). Before receiving new flow rules, each SDN switch mutually authenticates with the SDN controller 102-1. Authentication mechanisms may be one or more of the following: a) certificate; b) pre-shared key; c) username/password; and d) physical layer security protection. After successful mutual authentication, a session key between each SDN switch and the SDN controller is obtained. This session key is used to provide confidentiality and integrity protection for the new flow rule transported from the SDN controller to each SDN switch. It is to be appreciated that authentication, authorization, integrity validation, and/or confidentiality validation are not performed in the event that the communication channel between the SDN controller and the SDN switch is known to be a secure communication channel.

1.7) After checking data integrity and decrypting using the keys generated in the same way as SDN controller 102-1 does, each SDN switch obtains this new flow rule and adds it into its flow table.

Then, data flow from Host_1 106-1 to Host_2 106-2 is transmitted according to this new policy set by automatic security management module 110.

Scenario 2: how does the SDN controller 102-1 deal with new flow rules conflicting with old flow rules. Assume a general application 112 sets a policy that data flows from Host_1 106-1 to Host_2 106-2 go from OpenFlow™ Switch_1 104-1 to OpenFlow™ Switch_3 104-3 for higher quality-of-service (QoS) since this path is short. The procedures of this policy implemented in SDN network 100 are as follows:

2.1) Same as step 1.1) in scenario 1.
2.2) Same as step 1.2) in scenario 1.
2.3) Same as step 1.3) in scenario 1.
2.4) The SDN controller 102-1 translates this policy into a new flow rule (called a second new flow rule) with the following additional attributes:
Characteristic of policy: real-time;
Role of the policy creator: user; and
Security privileged level of role: L2

2.5) The flow table manager 132 is triggered to check if there is an existing or available flow rule in the current flow tables 134 for the specified data flow (data flow from Host_1 to Host_2). Now flow table manager 132 determines whether or not there is an existing flow rule (the first new flow rule generated in Scenario 1) for the specified data flow (data flow from Host_1 to Host_2) in flow tables 134. Then, flow table manager 132 checks and determines the security privilege level of the first new flow rule is higher than that of the second new flow rule. So, the second new flow rule is dropped. A failure notification is sent by the SDN controller 102-1 to the general application 112.

Therefore, the non-bypass security policy set by Automatic Security Management will not be overwritten by a QoS policy set by a general Application.

Figure 2:
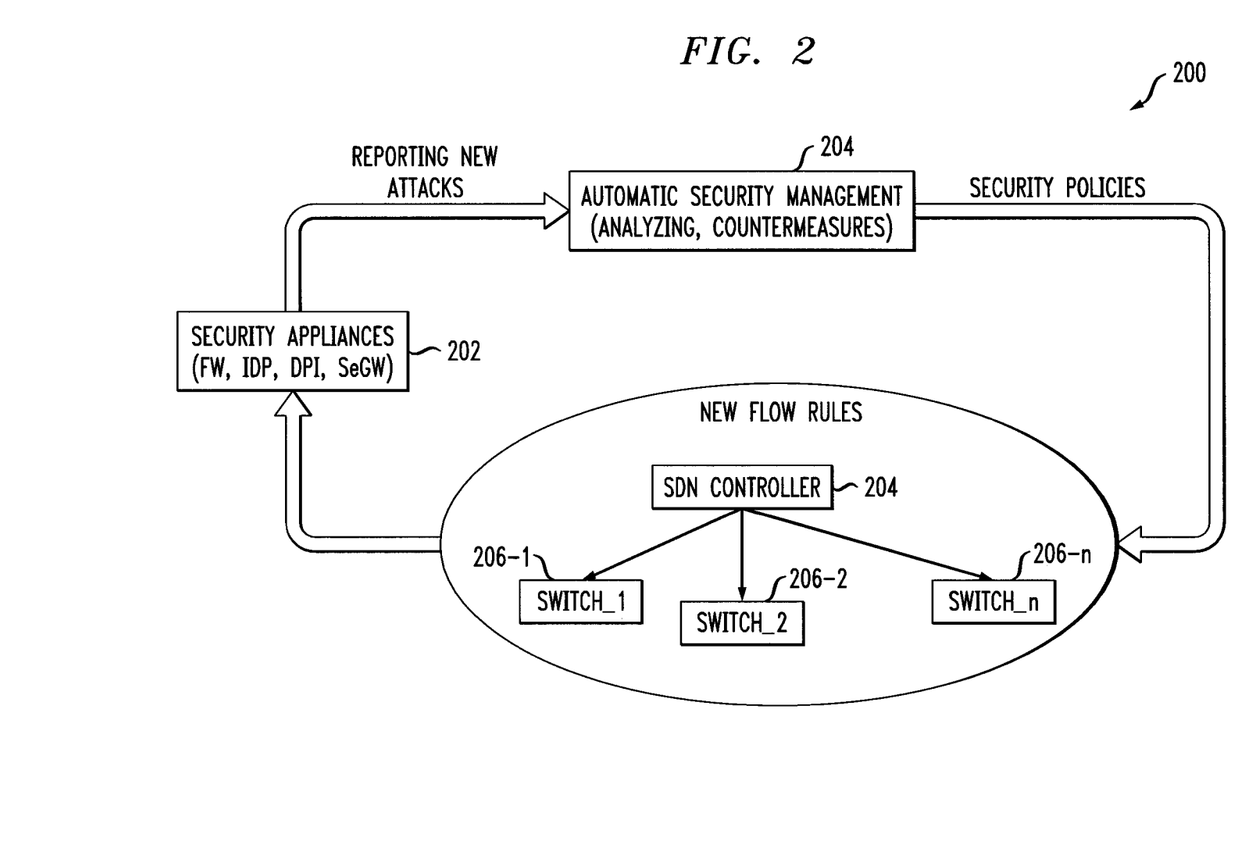
FIG. 2 shows a security methodology for use in an SDN network according to one embodiment.

Scenario 3: how does the SDN controller 102-1 automatically and promptly react to new security attacks. Referring now to methodology 200 in FIG. 2, the procedures can be described as follows:

1) In step 202, one or more security appliances 108 detect security incidents and report them to automatic security management module 110.

2) In step 204, automatic security management module 110 receives the incident report and analyzes it. Then, automatic security management module 110 generates countermeasures and security policies based on knowledge learned from its analysis. Those security policies are sent to SDN controller 102-1.

3) In step 204, the SDN controller 102-1 receives these security policies and translates them into new flow rules. These flow rules are delivered to the SDN switches 206-1, 206-2, . . . , 206-n.

4) The SDN switches 206-1, 206-2, . . . , 206-n deal with flows (forwarding, dropping, or reporting to the SDN controller) according to the new flow rules so that the security incidents or threats mentioned in step 1 can be mitigated or stopped.

Scenario 4: Packet scan detection. Assume administrator management module 116 creates a policy that the first m consecutive packets from each n consecutive packets of the flow from Host_1 to Host_2 are to be copied and forwarded to one or more of the security appliances 108 (e.g., FW, DPI, IPS, IDS) for data detection. The procedures of this policy implemented in SDN network 100 are as follows:

4.1) Same as step 1.1) in scenario 1.
4.2) Same as step 1.2) in scenario 1.
4.3) Same as step 1.3) in scenario 1.
4.4) The SDN controller 102-1 translates this policy into a new flow rule (called as a second new flow rule) with the following additional attributes:
Characteristic of policy: periodically;
Role of the policy creator: general administrator
Security privileged level of role: L4;
Conditions: the data flow from Host_1 to Host_2; and
Patterns: to select m consecutive packets from each n consecutive packets of the flow So in this scenario 4, the current flow table format in the SDN controller 102-1 is extended in order to reflect at least the above five attributes. The last attribute, i.e., patterns, may be reflected into the format of the flow table in the SDN switch.

Moreover, a new action (OFPAT_DETECTION) is assigned to the flow meeting the above conditions.

4.5) Same as step 1.5) in scenario 1.
4.6) same as step 1.6) in scenario 1 with the one difference being that the characteristic of this policy is periodic, not real-time.
4.7) same as step 1.7 in scenario 1.

In an illustrative embodiment, some changes may be implemented in the SDN switch. For example, a counter is used to count the packet numbers, and the pattern attribute is added into the format of the flow tables.

In one illustrative embodiment, some changes may be made in the ONF specification "OpenFlow™ Switch Specification version 1.4," the disclosure of which is incorporated herein by reference in its entirety, to implement one or more embodiments. More particularly, paragraphs 5.12 and 7.2.4 of the ONF specification may be modified as explained below.

For section "5.12 Actions," an optional action may be added as follows:

Optional Action: The detection action forwards a packet to a specified OpenFlow™ port then to the security appliances (e.g., FW, IDP, DPI, etc.).

For section "7.2.4 Action Structures," the action structure may be changed as follows:

```
enum ofp_action_type {
    OFPAT_OUTPUT = 0,              /* Output to switch port. */
    OFPAT_DETECTION = XX (a given number), /* Output to
    switch port. */
    OFPAT_COPY_TTL_OUT = 11,       /* Copy TTL "outwards" --
    from next-to-
outermost
to outermost */
    OFPAT_COPY_TTL_IN = 12,        /* Copy TTL "inwards" --
    from outermost to
next-to-outermost */
    OFPAT_SET_MPLS_TTL = 15,       /* MPLS TTL */
    OFPAT_DEC_MPLS_TTL = 16,       /* Decrement MPLS TTL */
    OFPAT_PUSH_VLAN = 17,          /* Push a new VLAN tag */
    OFPAT_POP_VLAN = 18,           /* Pop the outer VLAN tag */
    OFPAT_PUSH_MPLS = 19,          /* Push a new MPLS tag */
    OFPAT_POP_MPLS = 20,           /* Pop the outer MPLS tag */
    OFPAT_SET_QUEUE = 21,          /* Set queue id when
    outputting to a port */
    OFPAT_GROUP = 22,              /* Apply group. */
    OFPAT_SET_NW_TTL = 23,         /* IP TTL. */
    OFPAT_DEC_NW_TTL = 24,         /* Decrement IP TTL. */
    OFPAT_SET_FIELD = 25,          /* Set a header field using
    OXM TLV format. */
    OFPAT_PUSH_PBB = 26,           /* Push a new PBB service
    tag (I-TAG) */
    OFPAT_POP_PBB = 27,            /* Pop the outer PBB service
    tag (I-TAG) */
    OFPAT_EXPERIMENTER = 0xffff
};
```

The new action, i.e., detection action, uses the following structure and fields:

```
/* Action structure for OFPAT_DETECTION, which sends
packets out 'port'.*/
struct ofp_action_detection {
    uint16_t type;      /* OFPAT_DETECTION. */
    uint16_t len;       /* Length is 16. */
    uint32_t port;      /* Output port. */
    uint16_t patterns;  /* One possible example of patterns is:
    to select m consecutive
packets from each n consecutive packets of the flow for packet
data scan detection. */
};
    OFP_ASSERT(sizeof(struct ofp_action_output) == 10);
```

Figure 3:
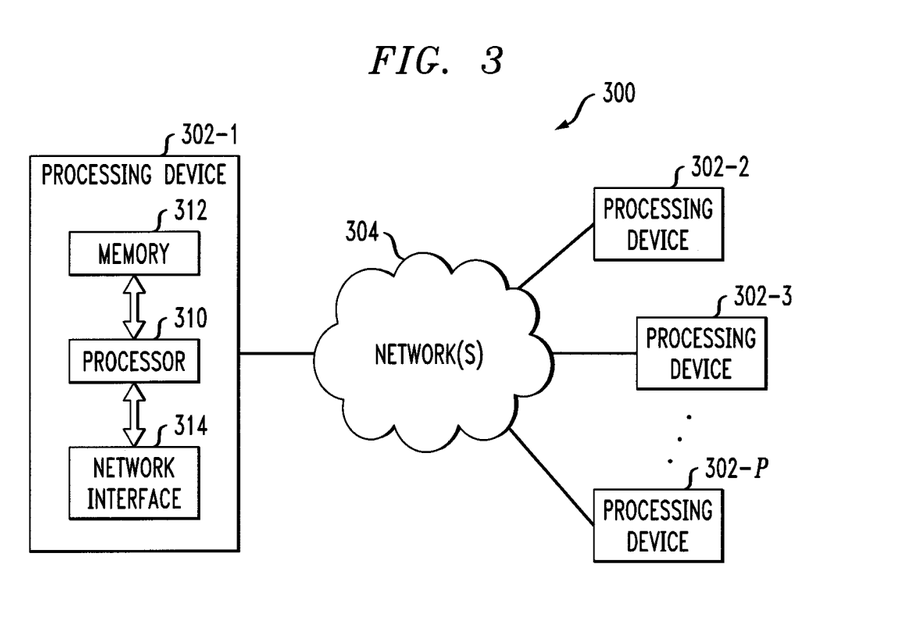
FIG. 3 shows a processing platform on which an SDN network with a security architecture is implemented according to one or more embodiments.

Turning now to FIG. 3, a processing platform is shown on which an SDN network and security architecture (e.g., 100 in FIG. 1) is implemented according to one or more embodiments. The processing platform 300 in this embodiment comprises a plurality of processing devices denoted 302-1, 302-2, 302-3, . . . 302-P, which communicate with one another over a network 304. One or more of the components and/or modules of SDN network 100 (e.g., SDN controllers, SDN switches, host computing devices, security appliances, and various modules) may therefore each run on one or more computers or other processing platform elements, each of which may be viewed as an example of what is more generally referred to herein as a "processing device." As illustrated in FIG. 3, such a device generally comprises at least one processor and an associated memory, and implements one or more functional modules for instantiating and/or controlling features of systems and methodologies described herein. Multiple elements or modules may be implemented by a single processing device in a given embodiment.

The processing device 302-1 in the processing platform 300 comprises a processor 310 coupled to a memory 312. The processor 310 may comprise a microprocessor, a microcontroller, an application-specific integrated circuit (ASIC), a field programmable gate array (FPGA) or other type of processing circuitry, as well as portions or combinations of such circuitry elements. Components of a system as disclosed herein can be implemented at least in part in the form of one or more software programs stored in memory and executed by a processor of a processing device such as processor 310. Memory 312 (or other storage device) having such program code embodied therein is an example of what is more generally referred to herein as a processor-readable storage medium. Articles of manufacture comprising such processor-readable storage media are considered embodiments. A given such article of manufacture may comprise, for example, a storage device such as a storage disk, a storage array or an integrated circuit containing memory. The term "article of manufacture" as used herein should be understood to exclude transitory, propagating signals.

Furthermore, memory 312 may comprise electronic memory such as random access memory (RAM), read-only memory (ROM) or other types of memory, in any combination. The one or more software programs when executed by a processing device such as the processing device 302-1 causes the device to perform functions associated with one or more of the components/steps of system/methodology 300. One skilled in the art would be readily able to implement such software given the teachings provided herein. Other examples of processor-readable storage media embodying embodiments may include, for example, optical or magnetic disks.

Also included in the processing device 302-1 is network interface circuitry 314, which is used to interface the processing device with the network 304 and other system components. Such circuitry may comprise conventional transceivers of a type well known in the art.

The other processing devices 302 of the processing platform 300 are assumed to be configured in a manner similar to that shown for processing device 302-1 in the figure.

The processing platform 300 shown in FIG. 3 may comprise additional known components such as batch processing systems, parallel processing systems, physical machines, virtual machines, virtual switches, storage volumes, logical units, etc. Again, the particular processing platform shown in FIG. 3 is presented by way of example only, and SDN network 100 of FIG. 1 may include additional or alternative processing platforms, as well as numerous distinct processing platforms in any combination.

Also, numerous other arrangements of servers, computers, storage devices or other components are possible. Such components can communicate with other elements of the system over any type of network, such as a wide area network (WAN), a local area network (LAN), a satellite network, a telephone or cable network, a storage network, a converged network or various portions or combinations of these and other types of networks.

Furthermore, it is to be appreciated that the processing platform 300 of FIG. 3 can comprise virtual machines (VMs) implemented using a hypervisor. A hypervisor is an example of what is more generally referred to herein as "virtualization infrastructure." The hypervisor runs on physical infrastructure. Processing platform 300 may also include multiple hypervisors, each running on its own physical infrastructure. As is known, VMs are logical processing elements that may be instantiated on one or more physical processing elements (e.g., servers, computers, processing devices). That is, a VM generally refers to a software implementation of a machine (i.e., a computer) that executes programs like a physical machine. Thus, different VMs can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

Although certain illustrative embodiments are described herein in the context of communication networks utilizing particular communication protocols, other types of networks can be used in other embodiments. As noted above, the term "network" as used herein is therefore intended to be broadly construed. Further, it should be emphasized that the embodiments described above are for purposes of illustration only, and should not be interpreted as limiting in any way. Other embodiments may use different types of network, device and module configurations, and alternative communication protocols, process steps and operations for implementing load balancing functionality. The particular manner in which network nodes communicate can be varied in other embodiments. Also, it should be understood that the particular assumptions made in the context of describing the illustrative embodiments should not be construed as requirements of the inventions. The inventions can be implemented in other embodiments in which these particular assumptions do not apply. These and numerous other alternative embodiments within the scope of the appended claims will be readily apparent to those skilled in the art.

What is claimed is:

1. A method comprising:
obtaining, at a controller of a software defined network, at least one security policy from a policy creator; and
implementing, via the controller, the security policy in the software defined network based on one or more attributes stored in the controller, the one or more attributes specifying each of a characteristic of the security policy, a role of the creator of the security policy, and a security privilege level of the role of the creator of the security policy;
wherein the method is performed by a processing device; and
wherein the characteristic of the security policy attribute describes whether the security policy is a real-time policy;
wherein when the characteristic of the security policy attribute indicates that the security policy is a real-time policy, the security policy is translated substantially without delay into one or more flow rules, updated in one or more flow tables, and synchronized with one or more software defined networking switches.

2. The method of claim 1, wherein the characteristic of the security policy specifies a manner in which the security policy is to be implemented in the software defined network.

3. The method of claim 2, wherein the manner in which the security policy is to be implemented in the software defined network comprises a real-time implementation.

4. The method of claim 2, wherein the manner in which the security policy is to be implemented in the software defined network comprises a periodic implementation.

5. The method of claim 2, wherein the characteristic of the security policy is one of urgent, general, and default.

6. The method of claim 1, wherein the role of the creator of the security policy specifies a network role assigned to the creator of the security policy.

7. The method of claim 6, wherein the role of the creator of the security policy is one of a security administrator, a general administrator, a user, and a guest.

8. The method of claim 1, wherein the security privilege level of the role of the creator of the security policy specifies a different hierarchical security privilege level for each different role assignable to the policy creator.

9. The method of claim 8, wherein on the condition that the security privilege level assigned to a first role is hierarchically lower than that of the security privilege level assigned to a second role, the security policy associated with the second role takes implementation priority over the security policy associated with the first role.

10. The method of claim 9, wherein on the condition that the security privilege level assigned to the first role is hierarchically higher than that of the security privilege level assigned to a second role, the security policy associated with the first role takes implementation priority over the security policy associated with the second role.

11. The method of claim 1, wherein the obtaining at least one security policy from a policy creator further comprises the controller performing at least one of an authentication operation, an authorization operation, an integrity validation operation, and a confidentiality validation operation with the policy creator.

12. The method of claim 11, wherein the obtaining at least one security policy from a policy creator further comprises the controller dropping the security policy on the condition that at least one of the authentication operation, the authorization operation, the integrity validation operation, and the confidentiality validation operation fans.

13. The method of claim 1, wherein the implementing the security policy further comprises the controller translating the security policy into at least one flow rule based on the one or more attributes specifying a characteristic of the security policy, a rule of the creator of the security policy, and a security privilege level of the role of the creator of the security policy.

14. The method of claim 13, wherein the implementing the security policy further comprises the controller determining whether there is a conflict between the flow rule translated from the security policy and an existing flow rule in a flow table.

15. The method of claim 14, wherein the implementing the security policy further comprises the controller resolving a conflict between the flow rule translated from the security policy and the existing flow rule in the flow table based on the security privilege level of the role of the creator of the security policy.

16. The method of claim 13, wherein the implementing the security policy further comprises the controller updating the flow table with the flow rule translated from the security policy.

17. The method of claim 13, wherein the implementing the security policy further comprises the controller distributing the flow rule translated from the security policy to one or more switches in the software defined network such that the one or more switches can effectuate data flow in the software defined network hi accordance with the flow rule.

18. The method of claim 17, wherein the implementing the security policy further comprises the controller performing at least one of an authentication operation, an integrity validation operation, and a confidentiality validation operation with the one or more switches before distributing the flow rule to one or more switches.

19. The method of claim 1, wherein the obtained security policy is a security policy developed in response to a new security threat detected by a security appliance of the software defined network.

20. The method of claim 1, wherein the obtained security policy comprises a packet scan detection instruction.

21. The method of claim 20, wherein the implementing the security policy further comprises the controller translating the security policy with the packet scan detection instruction into a flow rule based on a data flow condition and a packet scan pattern such that one or more switches in the software defined network to which the translated flow rule is distributed are instructed to forward one or more specified packets passing there through to a security appliance in the software defined network.

22. An article of manufacture comprising a processor-readable storage medium having embodied therein executable program code that when executed by the processing device causes the processing device to perform:
obtaining, at a controller of a software defined network, at least one security policy from a policy creator; and
implementing, via the controller, the security policy in the software defined network based on one or more attributes stored in the controller, the one or more attributes specifying each of a characteristic of the security policy, a role of the creator of the security policy, and a security privilege level of the role of the creator of the security policy;
wherein the characteristic of the security policy attribute describes whether the security policy is a real-time policy;
wherein when the characteristic of the security policy attribute indicates that the security policy is a real-time policy, the security policy is translated substantially without delay into one or more flow rules updated in one or more flow tables, and synchronized with one or more software defined networking switches.

23. An apparatus comprising:
a memory; and
a processor operatively coupled to the memory to form a controller of a software defined network, the controller being configured to:
obtain at least one security policy from a policy creator; and
implement the security policy in the software defined network based on one or more attributes stored hi the controller, the one or more attributes specifying each of a characteristic of the security policy, a role of the creator of the security policy, and a security privilege level of the role of the creator of the security policy;
wherein the characteristic of the security policy attribute describes whether the security policy is a real-time policy;
wherein when the characteristic of the security policy attribute indicates that the security policy is a real-time policy, the security policy is translated substantially without delay into one or more flow rules, updated in one or more flow tables, and synchronized with one or more software defined networking switches.

\* \* \* \* \*